Nov. 10, 1959   A. W. DOUGLAS ET AL   2,912,047
CIRCUMFERENTIALLY TRAVELING TYPE TIRE
MOUNTING AND DEMOUNTING DEVICE
Filed April 9, 1956   2 Sheets-Sheet 1
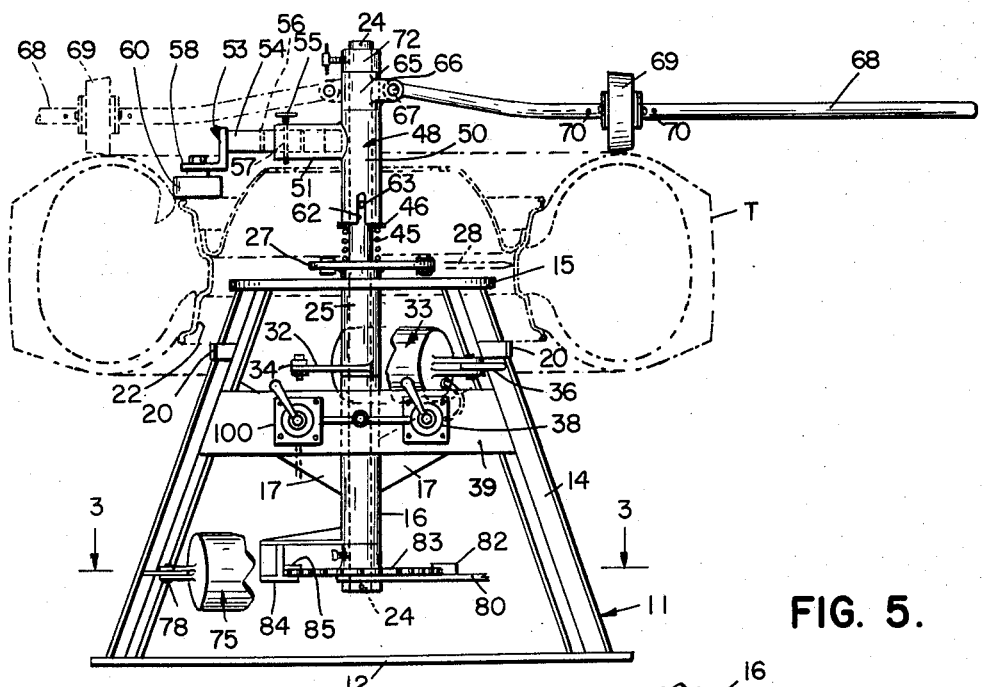
FIG. 1.
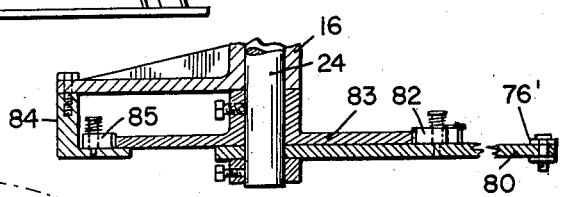
FIG. 5.
FIG. 2.
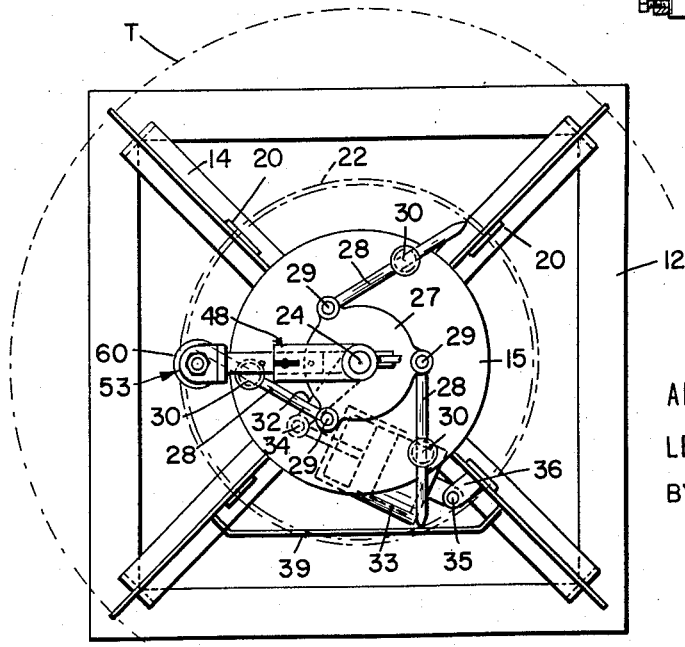
INVENTORS
ARTHUR W. DOUGLAS
LEOPOLD F. REISIG
BY
*Mason & Graham*
ATTORNEYS

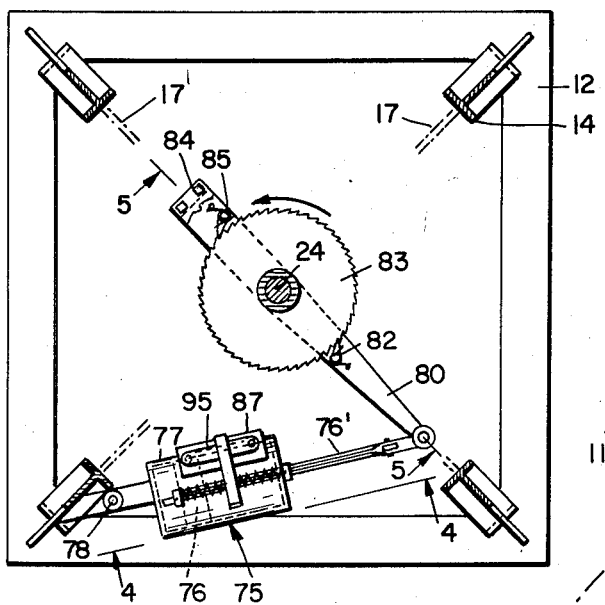
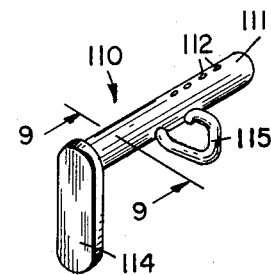
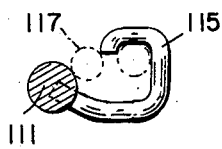
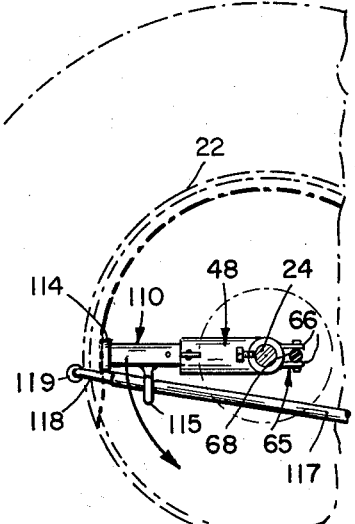
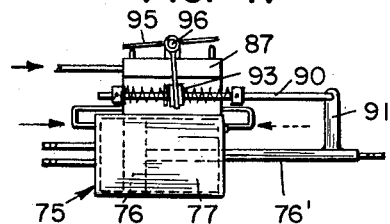
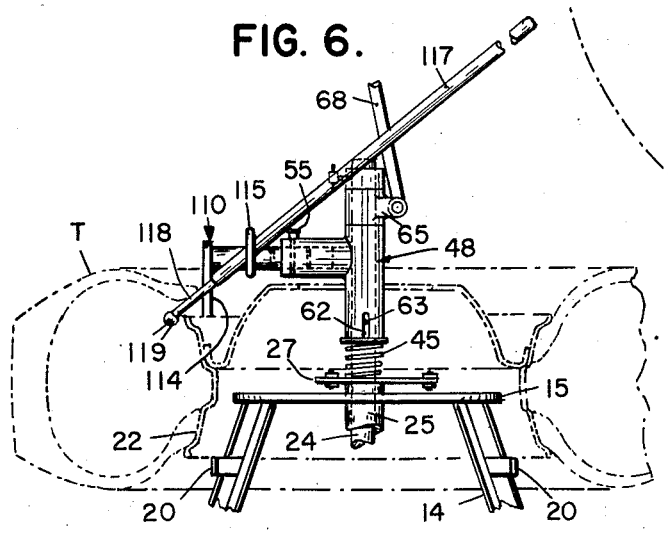
INVENTORS
ARTHUR W. DOUGLAS
LEOPOLD F. REISIG
BY
ATTORNEYS

2,912,047

CIRCUMFERENTIALLY TRAVELING TYPE TIRE MOUNTING AND DEMOUNTING DEVICE

Arthur W. Douglas, Los Angeles, and Leopold F. Reisig, Arcadia, Calif.

Application April 9, 1956, Serial No. 576,888

5 Claims. (Cl. 157—1.24)

This invention has to do with apparatus for mounting pneumatic tires upon drop-center rims and for removing tires therefrom.

An object of the invention is to provide a new and improved tire mounting and demounting apparatus for automotive and truck tires. The apparatus is particularly designed for heavy-duty work, such as the mounting and demounting of truck tires. The relatively recent adoption of tubeless tires for trucks has necessitated the use of a truck wheel having a rim with a drop center of the same general type commonly used on automobiles. Consequently the tubeless truck tire must be mounted in the same manner as the tires for automobiles, that is, by forcibly expanding the tire beads over the rim of the wheel. This is an extremely difficult operation with apparatus which has heretofore been available due the large size and relative stiffness of truck tires which have as many as ten or twelve plies as compared to the usual four-ply automobile tire.

It is therefore a particular object of the invention to provide a tire mounting and demounting device by means of which it is possible to readily mount or demount any type of pneumatic tire upon a wheel having a drop-center rim and apparatus wherein power means is provided for facilitating the operation. In this connection it is an object to provide such a device by means of which it is possible to mount or demount a heavy truck tire or the like within a matter of a few seconds.

Another object is to provide apparatus of the type indicated which is of simple construction and can be readily operated without in any way injuring the tire.

A further object is to provide a power-operated device of the type indicated which uses compressed air as the source of motive power.

These and other objects will be apparent from the drawings and the following description. Referring to the drawings:

Fig. 1 is an elevational view, partly broken away, showing apparatus embodying the invention;

Fig. 2 is a plan view of the apparatus of Fig. 1;

Fig. 3 is a sectional plan view on line 3—3 of Fig. 1;

Fig. 4 is an elevational view of a portion of the apparatus as viewed from the plane indicated by line 4—4 of Fig. 3;

Fig. 5 is a sectional view on line 5—5 of Fig. 3;

Fig. 6 is an elevational view of the upper portion of the apparatus showing its use in the removal of a tire;

Fig. 7 is a plan view of the apparatus shown in Fig. 6;

Fig. 8 is a perspective view on an enlarged scale of a tool; and

Fig. 9 is a sectional view on line 9—9 of Fig. 8.

More particularly describing the invention, numeral 11 designates a table-like frame having a base 12, four inclined legs 14, and a top 15 in the form of a circular plate. These parts may be welded together or otherwise secured to form a rigid structure. Mounted centrally of the frame is a vertical, stationary tube 16. This is supported by rigidly attached braces 17 which extend from the tube to the respective legs 14.

Each leg of the frame is provided with a laterally extending finger or projection 20 adjacent but below the top 15. The projections 20 act to form a support for a wheel 22 shown in broken lines. The wheel upon which the tire is to be mounted or from which it is to be removed is first placed over the top of the frame so as to rest upon the projections 20. After this the wheel is locked in place against movement by means we will now describe.

Journaled in tube 16 is a shaft 24 which extends beyond the ends of the tube and above the frame to a substantial height. We provide a sleeve 25 on the shaft and this projects to opposite sides of the top 15. At its upper end the sleeve is provided with a flange-like actuating plate 27 to which are pivotally secured three rods 28 at the pivotal points 29. These rods project tangentially of the plate 27 and are slidably received in guides 30, respectively, rotatively mounted in the plate 15.

The lower end of sleeve 25 is provided with an arm 32 for actuation by a piston-cylinder power unit 33. One end of this unit is pivotally mounted at the end of the arm 32 at 34 and the other end is pivotally mounted at 35 on a bracket 36 attached to one of the legs 14 of the frame. The piston-cylinder unit 33 is adapted to be operated by compressed air and for this purpose we show a valve 38 mounted on a panel 39 extending through two of the legs of the frame. The panel may carry a suitable fitting for the attachment of an air supply hose. It is contemplated that the valve and unit 33 be so connected by conduits in a conventional way that compressed air may be selectively applied to either end of the cylinder.

With the construction described, when the piston-cylinder unit 33 is expanded, the sleeve 25 is rotated in a direction to force rods 28 out into engagement with a wheel 22, resting on the frame, serving to lock the wheel in place.

On the shaft above the sleeve we provide a coil spring 45 and on this a washer 46 against which a tool holder 48 rests.

The tool holder 48 comprises a tubular body 50 and a radially projecting tubular section 51. The latter is adapted to mount various tools, such, for example, as the tool 53, shown in Figs. 1 and 2. This comprises a body having a cylindrical section 54 which is received in the tubular section 51 of the tool holder and is adjustably secured by means of a pin 55 which passes through selected holes 56 in the member 54 and a hole 57 in member 51. A bracket 58 at the end of member 54 carries a tire-engaging roller 60 whose axis of rotation is parallel to that of the shaft 24.

The lower end of the body of the tool holder is slotted at 62 to receive a drive pin 63 projecting laterally of the shaft 24. Thus the tool holder is positively driven by the shaft and is resiliently cushioned by spring 45 against downward movement.

Above the tool holder we provide a collar 65 free on the shaft. The collar has apertured ears 66 which carry a pin 67 upon which is mounted an arm or bar 68. This carries a roller 69 which is adjustable on the bar between pins 70. A set collar 72 may be provided at the top of the shaft to hold the parts in assembled position.

The shaft 24 is adapted to be intermittently rotated by a piston-cylinder unit 75, including a piston 76 and cylinder 77. The cylinder is pivotally mounted at 78 upon one of the legs of the frame. The piston rod 76' is pinned to an arm 80 which is pivotally mounted upon the shaft 24 and carries a feed pawl 82 for engagement with a ratchet wheel 83 secured to the shaft. A member 84 is provided to support a holding pawl 85.

The piston-cylinder unit 75, which is preferably adapted for operation by compressed air, has an automatic reversing linkage and valve means so that when air under pressure is supplied to the valve, designated 87, it will be alternately applied to opposite ends of the cylinder by the mechanism comprising the rod 90 connected to the piston rod by post 91, a grooved collar or the like 93 on the rod receiving a T-shaped valve actuating rocker 95 pivoted at 96. The reversing mechanism is only shown in elevation, since any conventional type of automatic reversing valve mechanism may be used.

The apparatus is provided with control valve 100 on the panel 39 for controlling the supplying of compressed air to the cylinder assembly 75, suitable conduits being provided.

In the operation of the device a tire, designated T, to be mounted upon the rim of the wheel 22, is initially placed upon the wheel rim so that its lowermost bead is on the rim, this being no particular problem. In order to fully mount the tire on the rim it is then necessary to roll in the uppermost bead and for this purpose the roller 60 is adjusted to contact the bead portion of the tire about as shown in Fig. 1. Assuming the wheel 22 has been locked in position, the shaft rotating means can then be started to intermittently slowly rotate the shaft 24 and the roller 60 which then rolls the bead of the tire outwardly forcing it to expand. During this operation the operator manipulates bar 68 in a manner to bring downward pressure through roller 69 against the side of the tire at a point spaced from roller 60 to cause the tire bead just behind roller 60 to move into the drop center of the rim. The bar 68 can be positioned originally so that roller 69 is 90° or more behind roller 60 and it usually may be held there as the roller 60 advances. The bar 68 is free to rotate about the shaft 24 independently thereof so that the roller 69 may be positioned at the most advantageous point with relation to the roller 60.

For the purpose of removing a tire from the rim we provide an auxiliary tool best shown in Figs. 6–9. This tool, designated 110, is mounted in the tool holder 48 in place of the tool 53. The tool 110 has a cylindrical main body 111 with pin-receiving holes 112 therethrough so that it may be adjustably mounted in the same manner as tool 53. At its outer end the tool is fitted with a depending lug or plate 114, the purpose of which will later become apparent. The tool 110 is also provided with a laterally extending hook member 115 which is adapted to receive a pry bar 117. The latter has a reduced section 118 and beyond that a rounded end portion 119.

In the use of the pry bar and tool 110, assuming the tire bead has been broken free of the rim (as by use of bar 68 and roller 69), the pry bar is first inserted between the rim and the tire from a position outwardly of that shown in Fig. 6 after which it is angled over to the position in which it is shown and secured in the hook 115 of the tool 110. In this position the side of the bar may bear against the finger 114. The shaft 24 is then rotated by the power-operated means previously described and the bar 117, which may be held at its outer end by an operator for security, then serves to progressively pry off the uppermost bead of the tire in the manner shown by broken lines in Fig. 7.

Although we have illustrated and described a preferred form of our invention, we contemplate that various changes and modifications can be made therein without departing from the invention, the scope of which is indicated by the following claims.

We claim:

1. In a tire mounting and demounting device, a frame, a vertical shaft journaled on the frame, means on the frame for supporting and holding a vehicle wheel concentric about said shaft, a tire-engaging tool means carried by the upper portion of said shaft, a ratchet wheel fixed to said shaft, a piston-cylinder unit, a ratchet pawl means engaging said wheel and operably connected to said piston-cylinder unit, automatically operable means for causing said piston-cylinder unit to reciprocate under the influence of applied fluid pressure, a collar rotatably mounted on said shaft above said tire-engaging tool means, a bar mounted on said collar for pivotal movement about an axis substantially normal to the axis of said shaft, and a roller on said bar.

2. In a tire mounting and demounting device, a frame including a central, vertically disposed tube, means on said frame for supporting a vehicle wheel concentric about the axis of said tube, a shaft journaled in said tube, a ratchet wheel fixed to said shaft below said tube, an automatically reciprocable, fluid-operated means including a ratchet wheel-engaging pawl for rotating said shaft carried by said frame, wheel-holding means carried on said frame, a tire-engaging tool means carried by said shaft above said portion of said wheel-holding means, a bar mounted for rotation on said shaft above said tire-engaging tool means, said bar being mounted for pivotal movement about a horizontal axis, and a roller carried by said bar.

3. A tire mounting and demounting device as set forth in claim 2 in which a coil spring is provided on said shaft between said portion of said wheel-holding means and said tire-engaging tool means whereby said tire-engaging tool means is resiliently supported axially of the shaft.

4. In a tire mounting and demounting device, a frame, a vertical shaft journalled on the frame, means on the frame for supporting and holding a vehicle wheel concentric about said shaft, power-operated means for rotating said shaft, a tubular tool holder on said shaft, interengaging means on said shaft and tool holder for establishing a driving connection therebetween, a first tire-engaging tool carried by said tool holder, a collar rotatably mounted on said shaft above said tool holder, a bar mounted on said collar for pivotal movement about an axis normal to the axis of said shaft, and a second tire-engaging tool carried by said bar.

5. In a tire mounting and demounting device, a frame adapted to rest on a floor surface, an upright tube carried by said frame, a vertical shaft journalled in said tube and extending below the lower end thereof and extending a substantial distance above the upper end thereof, a sleeve on said shaft above said tube, means carried by said sleeve for supporting and holding a vehicle wheel concentric about said shaft, a tubular tool holder on said shaft above said sleeve, a tire-engaging tool mounted on said tool holder, a driving connection between said shaft and said tool holder, a collar rotatably carried on said shaft above said tool holder, a bar mounted on said collar for pivotal movement about an axis normal to the axis of said shaft, a tire-engaging roller mounted on said bar, and power-operated means carried by said frame operatively connected to the lower end of said shaft for rotating the same.

References Cited in the file of this patent

UNITED STATES PATENTS

| | | |
|---|---|---|
| 702,652 | Ivor | June 17, 1902 |
| 1,208,184 | Mayer | Dec. 12, 1916 |
| 1,386,220 | Anderson | Aug. 2, 1921 |
| 1,587,634 | Dickey et al. | June 8, 1926 |
| 2,065,644 | Bristol | Dec. 29, 1936 |
| 2,413,010 | Teegarden | Dec. 24, 1946 |
| 2,418,849 | Polt | Apr. 15, 1947 |
| 2,437,512 | Ekse | Mar. 9, 1948 |
| 2,470,534 | Thomas | May 17, 1949 |
| 2,546,849 | Branick | Mar. 27, 1951 |
| 2,569,788 | Weaver | Oct. 2, 1951 |
| 2,569,789 | Weaver | Oct. 2, 1951 |
| 2,695,659 | Athmann | Nov. 30, 1954 |
| 2,758,569 | Peterson | Aug. 14, 1956 |
| 2,767,781 | Lewis | Oct. 23, 1956 |
| 2,797,795 | West | July 2, 1957 |